US009644489B1

(12) United States Patent
Tham et al.

(10) Patent No.: US 9,644,489 B1
(45) Date of Patent: May 9, 2017

(54) ADDITIVE MANUFACTURING OF ABRADABLE MESH STRUCTURE ON RING SEGMENT SURFACE

(71) Applicant: Siemens Energy, Inc., Orlando, FL (US)

(72) Inventors: Kok-Mun Tham, Oviedo, FL (US); Ching-Pang Lee, Cincinnati, OH (US); Li Shing Wong, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 14/970,762

(22) Filed: Dec. 16, 2015

(51) Int. Cl.
| | |
|---|---|
| *F01D 11/12* | (2006.01) |
| *B28B 1/00* | (2006.01) |
| *B28B 11/04* | (2006.01) |
| *B23K 26/342* | (2014.01) |
| *B33Y 10/00* | (2015.01) |
| *B33Y 80/00* | (2015.01) |
| *B23K 101/00* | (2006.01) |

(52) U.S. Cl.
CPC .......... *F01D 11/122* (2013.01); *B23K 26/342* (2015.10); *B28B 1/001* (2013.01); *B28B 11/04* (2013.01); *B33Y 10/00* (2014.12); *B33Y 80/00* (2014.12); *B23K 2201/001* (2013.01); *F05D 2220/32* (2013.01); *F05D 2230/31* (2013.01)

(58) Field of Classification Search
CPC ....... F01D 11/08; F01D 11/122; B23K 26/34; B23K 26/342; B28B 1/001; B28B 11/04; B33Y 10/00; B33Y 80/00; F05D 2230/10; F05D 2230/31; F05D 2240/11; F05D 2250/181

USPC ............................................. 415/174.4, 173.4
See application file for complete search history.

(56) References Cited

U.S. PATENT DOCUMENTS

| | | | | |
|---|---|---|---|---|
| 3,519,282 | A * | 7/1970 | Davis | B22F 3/114 277/414 |
| 4,139,376 | A * | 2/1979 | Erickson | B22F 3/002 277/411 |
| 5,705,231 | A * | 1/1998 | Nissley | C23C 4/02 427/419.3 |
| 8,939,707 | B1 | 1/2015 | Lee et al. | |
| 9,151,175 | B2 | 10/2015 | Tham et al. | |
| 2015/0240653 | A1 | 8/2015 | Lee et al. | |

(Continued)

*Primary Examiner* — Craig Kim
*Assistant Examiner* — Danielle M Christensen

(57) ABSTRACT

An abradable turbine component, a method of creating a turbine component with an abradable mesh structure, and a gas turbine engine are provided. The abradable turbine component includes a turbine component surface for coupling to a turbine casing, and a deposited abradable mesh structure coupled to the turbine component surface. The abradable mesh structure includes interlacing strands of material, each strand including a height relative to the turbine component surface. At least two of the plurality of interlacing strands include a height different from each other. The method includes applying a bond coat layer followed by a thermal barrier coating layer. An abradable mesh structure is deposited on top of thermal barrier coating wherein the abradable mesh structure includes interlacing strands of material wherein at least two of the interlacing strands include a height different from each other. A gas turbine engine including the abradable turbine component is also provided.

18 Claims, 3 Drawing Sheets

(56) References Cited

U.S. PATENT DOCUMENTS

2016/0003083 A1\* 1/2016 Delisle ................ F01D 11/122
                                                                     60/805

\* cited by examiner

View A-A

View B-B

View C-C

ADDITIVE MANUFACTURING OF ABRADABLE MESH STRUCTURE ON RING SEGMENT SURFACE

BACKGROUND

1. Field

The present application relates to gas turbines, more particularly to an abradable turbine component, and a method to create an abradable mesh structure on a turbine component.

2. Description of the Related Art

In the gas turbine engine industry, there is an increasing drive towards producing gas turbines with higher efficiencies. In order to achieve these higher efficiencies, gas turbines are operating at increasingly higher turbine temperatures. An additional measure taken to achieving higher gas turbine efficiency, could be to keep a tight clearance between the turbine blade tips and the opposing surface. Ideally, the clearance, or gap, between the rotating turbine blades and the opposite turbine component would be small enough to minimize the air flow leakage between the pressure side of the blade and the suction side of the blade while still maintaining enough distance to account for manufacturing variances of the opposing component surfaces and the thermal growth of the components due to the high temperatures.

In order to cope with the extremely high temperatures within the flow path of the gas turbine, many turbine components that are within the fluid flow path require the use of thermal barrier coatings (TBCs) to protect the underlying components from the harsh environment in the fluid flow path. Coatings comprised of a ceramic structure that can withstand extreme temperatures and also have good abradability so that they can wear or abrade as necessary are often used on these turbine components. For example, the turbine ring segment which is located radially outwards of the turbine blade tips, may come into contact with the turbine blade tips during engine operation. Because of this turbine blade tip incursion into the coating on the ring segment surface, it is crucial that the coating has good abradability as it is highly undesirable for the expensive material of blade tips to wear and/or to increase the gap between the blade tip and the ring segment surface. An abradable, sacrifical surface on the turbine component opposite the blade tip provides a compromise so that a small minimal gap may be maintained while taking into account that because of transient thermal growth/distortion and manufacturing variances of the components, the blade tip may rub into the abradable coating causing the abradable coating to wear instead of the blade tips.

Typically, the abradable surfaces have been applied to the turbine component using a 'subtractive' method. The abradable coating comprising a porous ceramic material is applied and then subtractively removed with a water jet machining method, for example, to produce the desired abradable surface profile. However, subtractive methods used to produce the abradable surface profile on the turbine component add a significant cost to manufacturing the component. Directly adding the desired surface profile to the turbine component would be more cost effective.

Additive Manufacturing, or 3-D printing, has recently been successfully used to 'print' or manufacture components directly layer by layer. This manufacturing technology enables the optimization of the component design. In the case of an abradable surface, additive manufacturing enables the ability to produce the abradable surface with a more complex geometry while keeping the manufacturing cost down. Laser Powder Forming is an additive manuafacturing method which builds up metallic or ceramic parts directly using CAD data by melting a fine powder with a laser beam, layer by layer.

SUMMARY

Briefly described, aspects of the present disclosure relates to an abradable turbine component, a method of creating a turbine component with an abradable mesh structure as well as a gas turbine engine.

A first aspect provides an abradable turbine component. The abradable turbine component includes a turbine component surface for coupling to a turbine casing and a deposited abradable mesh structure coupled to the turbine component surface. The abradable mesh structure includes a plurality of interlacing strands of material, each strand including a height relative to the turbine component surface. At least two of the plurality of interlacing strands include a height different from each other.

A second aspect provides a method of creating a turbine component with an abradable mesh structure. The method includes applying a bond coat layer followed by a thermal barrier coating layer such that the bond coat layer is between the surface of the turbine component and the thermal barrier coating layer and depositing an abradable mesh structure on top of the thermal barrier coating layer. The abradable mesh structure includes a plurality of interlacing strands of material, each strand including a height relative to the turbine component surface. At least two of the plurality of interlacing strands include a height different from each other.

A third aspect provides a gas turbine engine. The gas turbine engine includes the abradable turbine component, a turbine casing to which the abradable turbine component is coupled and a rotating turbine blade mounted rotatively from a shaft within the gas turbine engine. The height of each interlacing strand extends towards the rotating turbine blade.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
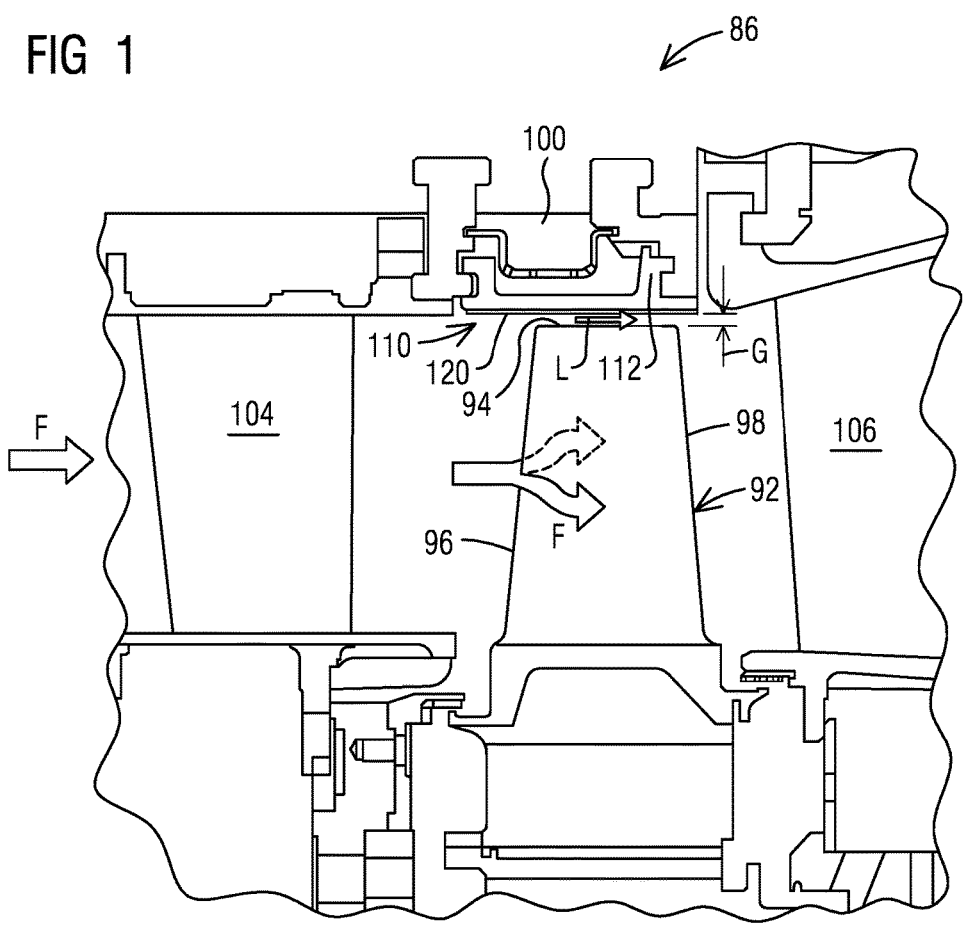
FIG. 1 . . . illustrates a detailed cross sectional view of a turbine blade and vanes showing blade tip gap G between a blade tip and abradable component of the turbine section of a gas turbine engine, FIG. 2 . . . illustrates a surface view of a first abradable mesh structure, FIG. 3 . . . illustrates a cross sectional view of the abradable mesh structure according to section A-A, FIG. 4 . . . illustrates a surface view of a second abradable mesh structure, FIG. 5 . . . illustrates a cross sectional view of the abradable mesh structure according to sections B-B and C-C, and FIG. 6 . . . illustrates a cross sectional view of an abradable mesh structure having a complex geometry.

FIG. 1 illustrates a cross sectional detailed view of the turbine section 86 of a gas turbine engine. Respective upstream vanes 104 and downstream vanes 106 direct upstream combustion gas fluid flow F generally parallel to the incident angle of the leading edge 96 of turbine blade 92 and redirect downstream combustion gas exiting the trailing edge 98 of the turbine blade 92. The turbine casing 100 is lined on the inner surface with a ring segment 112 which includes a ring segment surface. This ring segment surface is in opposed spaced relationship with the blade tip 94 by a blade tip gap G. The ring segment surface is coated with a bond coat layer followed by a dense non-abradable thermal barrier coated layer for thermal protection of the ring segment 112. An abradable layer 120 exists on the non-abradable thermal barrier coating such that the surface of abradable layer 120 is directly opposite from the blade tip surface 94 across the tip gap G.

The abradable layer 120 is typically constructed of a metallic/ceramic substrate and is more abrasive than the turbine blade tip material. While it is desired that a tight blade tip gap G is maintained, incursion of the blade tips 94 into the abrasive material may occur during engine operation due to thermal expansion of the components as well as manufacturing variances of the components, for example. As mentioned previously, a tight blade gap G is desired in order to minimize blade tip 94 airflow leakage L between the pressure side of the blade and the suction side of the blade as well as axially in the combustion flow direction F. When blade tip incursion into the abradable layer 120 occurs, however, the abradable layer 120 takes the wear instead of the blade tips 94.

Figure 2:
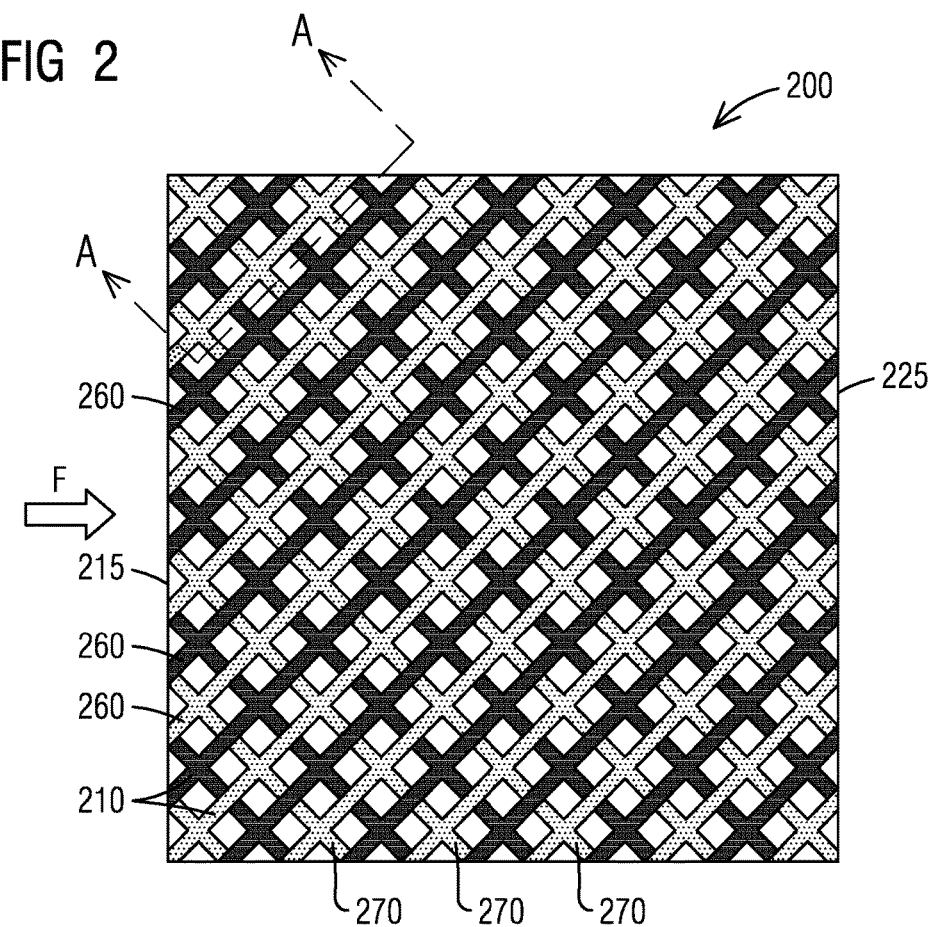

FIG. 2 illustrates a surface view of a first abradable mesh structure 200 which comprises the abradable layer 120. The fluid flow direction F from the leading edge of the abradble structure 215 to the trailing edge of the abradable structure 225 is also shown. The abradable mesh structure 200 may be deposited on top of the thermal barrier coating of a turbine component 112 as shown. The abradable mesh structure 200 may comprise interlacing strands 210 of material where each strand includes a height relative to the surface of the turbine component 112. The height of each strand may extend from the surface towards a rotating turbine blade tip 94.

Figure 3:
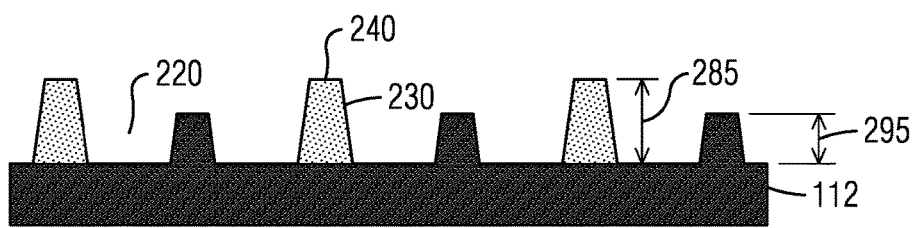

The interlacing strands 210 of the mesh structure 200 include at least two strands 210 having heights different from each other. The different heights are illustrated in FIG. 2 wherein the two different heights of interlacing strands are indicated by different shades. The plurality of interlacing strands 210 may include a first set of interlacing strands 260 which run parallel to one another and a second set of interlacing strands 270 which run parallel to one another. The two sets of interlacing strands 260, 270 interlace with one another. Adjacent strands in each of the first set 260 and the second set 270 may be separated by a groove 220 as shown in FIG. 3. These grooves 220 may reduce the abradable surface material cross section which potentially reduces blade tip 94 wear when blade tip incursion occurs. The first set 260 and the second set 270 may cross each other at a right angle as shown.

FIG. 3 illustrates a cross sectional view according to the section A-A in FIG. 2 which includes interlacing strands of two different heights, a first height 285, and a second height 295. A cross section of each strand as shown may include a ridge 230 projecting from the surface of the turbine component 112 with a flat tip surface 240. In the illustrated embodiment, adjacent ridges 230 are separated by a groove 220. While the embodiment shown illustrates a ridge 230 separated by a groove 220, one skilled in the art would understand that other cross sectional geometries of the interlacing strands 210 are also possible.

In the embodiment shown in FIG. 2, adjacent strands in the first set of interlacing strands 260 include a different height from each other and adjacent strands in the second set of interlacing strands 270 include a different height from each other such that the first set of interlacing strands 260 and the second set of interlacing strands 270 include strands of different heights.

Figure 4:
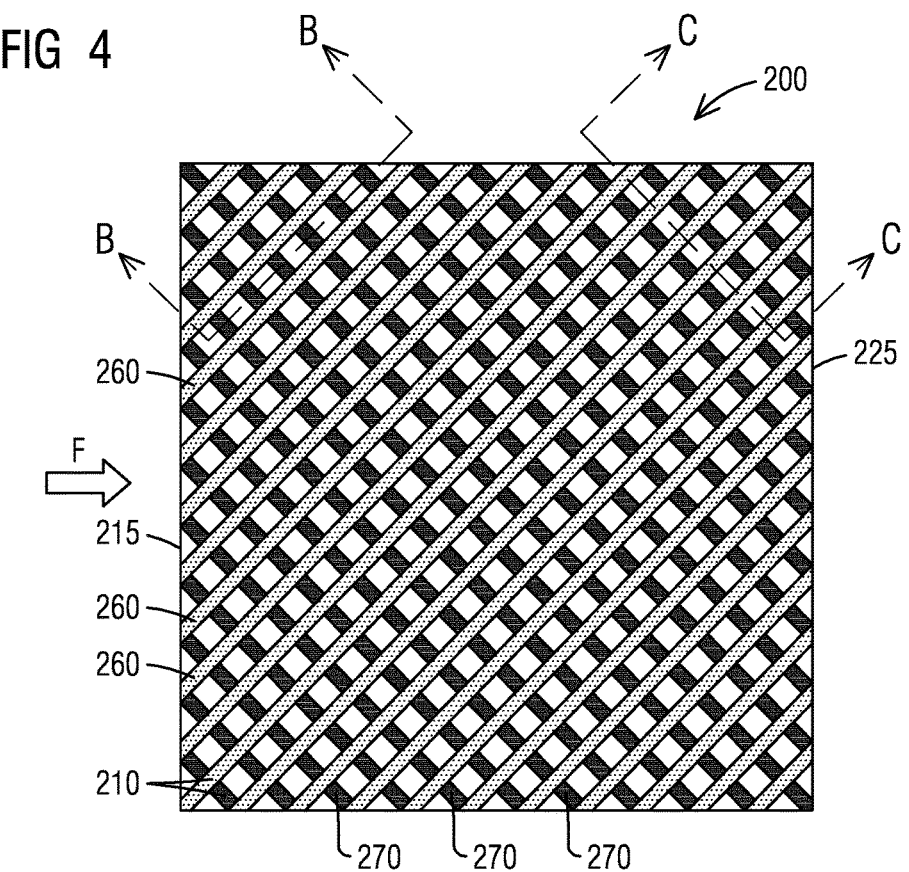
Figure 5:
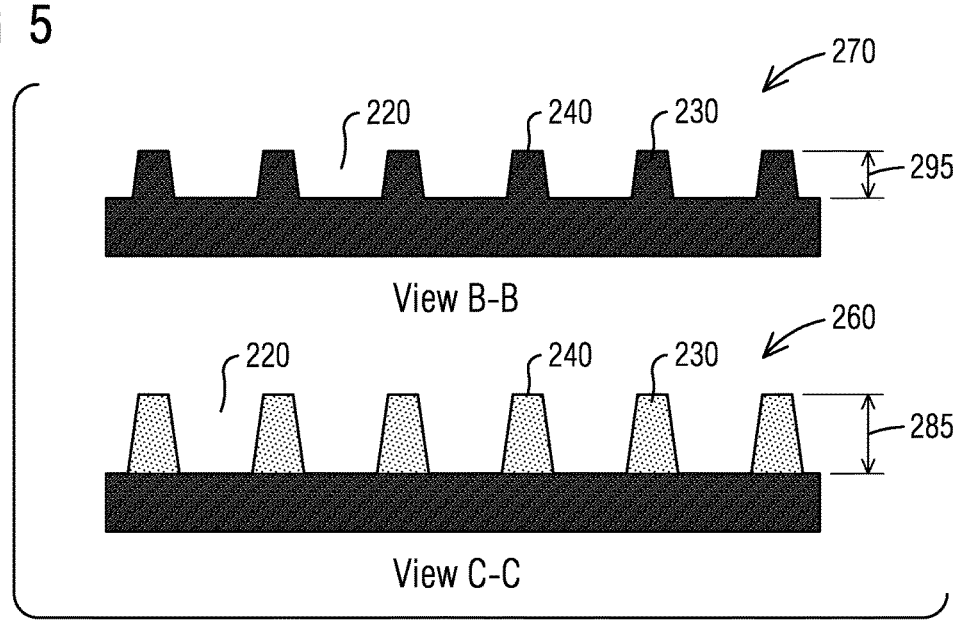

In another embodiment, the first set of interlacing strands 260 includes a first height 285 and the second set of interlacing strands 270 includes a second height 295. The first height 285 and the second height 295 are different. This embodiment is shown in FIG. 4. FIG. 5 illustrates the sections according to B-B and C-C, respectively, where the first set of interlacing strands 260 includes a first height 285 and the second set of interlacing strands 270 includes a different second height 295. Both cross sections shown in FIG. 5 include a cross sectional geometry of a ridge 230 projecting from the surface of the turbine component 112 with a flat tip surface 240. In the illustrated embodiment adjacent ridges 230 are separated by a groove 220.

The abradable mesh structure 200 may also include several layers where each layer includes a different cross sectional geometry such that the geometry of the abradable mesh structure 200 is complex. Each layer may also include a different density. An example of a mesh structure 200 with a complex geometry including two layers 310, 320 may be seen in FIG. 6. A bottom first layer 310 includes first set of strands 260 with the cross sectional shape of ridge and a second set of adjacent strands 270, which are separated by a groove 330 from the first set 260, include a cross section of a rectangle. A second top layer 320 includes a cross sectional shape such that portions of the second layer 320 overhangs the groove 330 of the first layer 310. The complex geometry of the abradable mesh structure 200 that include portions 340 that overhang a bottom layer 310, for example, would not be possible or at best would be extremely difficult using subtractive methods such as water jet machining. For example, in order to create the complex geometry of the abradable mesh structure 200 in FIG. 6 using a subtractive method the water jet would have to remove the material of the groove 330 without removing any of the overhanging portion directly above it. The material of the groove would be very difficult to access in for this example. However, the abradable mesh structure 200 as described and shown in FIG. 6 may be possible using an additive manufacturing, or 3D printing, method which creates the mesh structure 200 layer by layer starting from the surface of the turbine component 112. A mesh structure 200 including a complex geometry as described above may allow easier blade incursion into the top layer in order to avoid blade tip damage. Additionally, the mesh structure 200 including a complex geometry may include a robust bottom layer to maintain blade tip clearance and may also produce a more tortuous path for the tip leakage flow.

In an embodiment, the porosity of the abradable mesh structure 200 increases from the leading edge of the abradable turbine component 215 to the trailing edge of the abradable turbine component 225. Typically the trailing edge of the abradable turbine component 225 has greater blade tip incursion observed from engine inspection.

Referring to FIGS. 1-6, a method of creating a turbine component with an abradable mesh structure 200 is also provided. In an embodiment, a bond coat layer followed by a thermal barrier coating layer is applied to the turbine component. In this embodiment, the bond coat layer would be between the surface of the turbine component and the thermal barrier coating. An abradable mesh structure 200 is deposited on top of the thermal barrier coating.

The abradable mesh structure 200 may comprise interlacing strands 210 of material where each strand includes a height relative to the surface of the turbine component. At least two of the interlacing strands 210 include a height different from each other.

In an embodiment, the depositing includes building up the abradable mesh structure 200 by melting a fine powder with a laser beam layer by layer. This deposition method is an additive manufacturing technique which collectively refers to producing manufactured components by building them up layer by layer. In this embodiment, the abradable mesh structure 200 is fabricated directly from a solid model using a ceramic or metal powder injected into a molten pool created by a laser beam.

Figure 6:
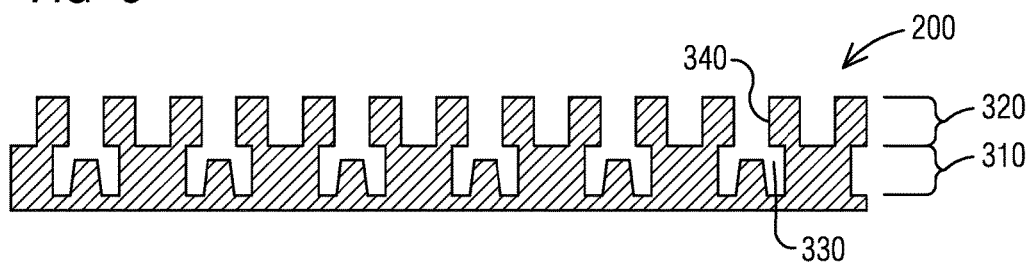

Producing a component layer by layer additively enables the abradable mesh structure 200 to include a complex geometry, such as that illustrated in FIG. 6, which is not currently possible to produce using subtractive methods such as external machining. As illustrated in FIG. 6, a mesh structure 200 having a complex geometry that is not possible to produce using subtractive methods may include a plurality of layers 310, 320 such that a top layer of the mesh structure 320 includes a portion 340 that overhangs a groove 330 of a bottom layer 310 formed underneath the top layer 320.

In an embodiment, the depositing includes customizing the porosity of the abradable mesh structure 200 such that the porosity increases from the leading edge of the abradable turbine component 215 to the trailing edge of the abradable turbine component 225.

Additionally, a gas turbine engine is provided. FIG. 1 illustrates the turbine section 86 of such a gas turbine engine. The turbine component may be, for example, a ring segment 112 which is coupled to a turbine casing 100. An abradable layer 120 is formed on the surface of the ring segment 112. A rotating turbine blade 92 may be mounted rotatively from a shaft within the gas turbine engine. The abradable mesh structure 200 includes a height that extends toward the rotating turbine blade 92. A gap G may or may not exist between the rotating turbine blade 92 and the abradable mesh structure 200 depending on blade tip incursion as described previously.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. An abradable turbine component, comprising:
   a turbine component surface for coupling to a turbine casing; and
   a deposited abradable mesh structure coupled to the turbine component surface,
   wherein the abradable mesh structure comprises a plurality of interlacing strands of material, each strand including a height relative to the turbine component surface, and
   wherein at least two of the plurality of interlacing strands include a height different from each other,
   wherein the plurality of interlacing strands include a first set of interlacing strands which run parallel to one another and a second set of interlacing strands which run parallel one another,
   wherein the first set and the second set interlace with one another, and
   wherein adjacent strands in each of the first set and the second set are separated by a groove,
   wherein the height of each strand refers to a dimension of the strand extending from the turbine component surface.

2. The abradable turbine component as claimed in claim 1,
   wherein the interlacing strands of first set and the second set cross each other at a right angle.

3. The abradable turbine component as claimed in claim 1,
   wherein the first set of interlacing strands include a first height and the second set of interlacing strands each include a second height,
   wherein the first height and the second height are different.

4. The abradable turbine component as claimed in claim 1, wherein adjacent strands in the first set of interlacing strands include a different height from each other, and
   wherein adjacent strands in the second set of interlacing strands include a different height from each other,
   wherein each of the first set of interlacing strands and the second set of interlacing strands include strands of different heights.

5. The abradable turbine component as claimed in claim 1,
   wherein a cross section of each strand include a ridge projecting from the turbine component surface with a flat tip surface, and
   wherein adjacent ridges are separated by a groove.

6. The abradable turbine component as claimed in claim 1, wherein the deposited abradable mesh structure includes a plurality of layers, wherein each layer includes a different cross sectional shape such that the deposited abradable mesh structure includes a complex geometry.

7. The abradable turbine component as claimed in claim 6, wherein the deposited abradable mesh structure of a top layer overhangs a groove of a bottom layer formed underneath the top layer.

8. The abradable turbine component as claimed in claim 1, wherein the porosity of the deposited abradable mesh structure increases from the leading edge of the abradable turbine component to the trailing edge of the abradable turbine component.

9. The abradable turbine component as claimed in claim 1, wherein the deposited abradable mesh structure is deposited using an additive manufacturing method.

10. A gas turbine engine, comprising:
    the abradable turbine component as claimed in claim 1;
    a turbine casing to which the abradable turbine component is coupled;
    a rotating turbine blade mounted rotatively from a shaft within the gas turbine engine,
    wherein the height of each interlacing strand extends towards the rotating tubine blade.

11. A method of creating a turbine component with an abradable mesh structure:
- applying a bond coat layer followed by a thermal barrier coating layer such that the bond coat layer is between the surface of the turbine component and the thermal barrier coating layer; and
- depositing an abradable mesh structure on top of the thermal barrier coating layer,
- wherein the abradable mesh structure comprises a plurality of interlacing strands of material, each strand including a height relative to the turbine component surface, and
- wherein at least two of the plurality of interlacing strands include a height different from each other,
- wherein the depositing includes customizing the porosity of the abradable mesh structure such that the porosity of the abradable mesh structure increases from the leading edge of the abradable turbine component to the trailing edge of the abradable turbine component, and
- wherein the height of each strand refers to a dimension of the strand extending from the turbine component surface.

12. The method as claimed in claim 11, wherein the depositing includes building up the abradable mesh structure by melting a fine powder with a laser beam layer by layer.

13. The method as claimed in claim 12, wherein the depositing includes producing an abradable mesh structure comprising a plurality of layers, wherein each layer includes a different cross sectional shape with the result that the abradable mesh structure includes a complex geometry.

14. The method as claimed in claim 13, wherein the abradable mesh structure of a top layer overhangs a groove of a bottom layer formed underneath the top layer.

15. The method as claimed in claim 11,
- wherein the plurality of interlacing strands include a first set of interlacing strands which run parallel to one another and a second set of interlacing strands which run parallel one another,
- wherein the first set and the second set interlace with one another, and
- wherein adjacent strands in each of the first set and the second set are separated by a groove.

16. The method as claimed in claim 15, wherein the first set of interlacing strands and the second set of interlacing strands cross each other at a right angle.

17. The method as claimed in claim 15,
- wherein the first set of interlacing strands each include a first height and the second set of interlacing strands each include a second height,
- wherein the first height and the second height are different.

18. The method as claimed in claim 11, wherein a cross section of each strand includes a ridge projecting from the surface of the turbine component with a flat tip surface, and wherein adjacent ridges are separated by a groove.

* * * * *